(12) United States Patent
Huysegems et al.

(10) Patent No.: US 8,973,077 B2
(45) Date of Patent: Mar. 3, 2015

(54) METHOD FOR STREAMING VIDEO CONTENT, NODE IN A NETWORK FOR MONITORING VIDEO CONTENT STREAMING

(75) Inventors: Rafael Huysegems, Walem (BE); Bart De Vleeschauwer, Schilde (BE)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 14/117,696

(22) PCT Filed: May 7, 2012

(86) PCT No.: PCT/EP2012/058361
§ 371 (c)(1),
(2), (4) Date: Nov. 14, 2013

(87) PCT Pub. No.: WO2012/156224
PCT Pub. Date: Nov. 22, 2012

(65) Prior Publication Data
US 2014/0089993 A1    Mar. 27, 2014

(30) Foreign Application Priority Data

May 17, 2011 (EP) ..................................... 11305593

(51) Int. Cl.
*H04N 7/00* (2011.01)
*H04N 7/18* (2006.01)
(Continued)

(52) U.S. Cl.
CPC ..... *H04N 21/2662* (2013.01); *H04N 21/44209* (2013.01); *H04N 21/6373* (2013.01);
(Continued)

(58) Field of Classification Search
USPC ........... 725/119, 118, 117, 116, 115, 114, 93, 725/91; 709/203, 217, 218, 219, 231
See application file for complete search history.

(56) References Cited

U.S. PATENT DOCUMENTS 5,928,331 A * 7/1999 Bushmitch ..................... 709/231
6,389,473 B1 * 5/2002 Carmel et al. ................. 709/231
(Continued)

FOREIGN PATENT DOCUMENTS

WO WO 2011/047335 A1 4/2011

OTHER PUBLICATIONS

International Search Report for PCT/EP2012/058361 dated Sep. 25, 2012.
(Continued)

*Primary Examiner* — Jefferey Harold
*Assistant Examiner* — Mustafizur Rahman
(74) *Attorney, Agent, or Firm* — Fay Sharpe LLP (57) ABSTRACT

The invention relates to a method of streaming video content from a server to a client over a channel via a network. Video content is offered as a set of consecutive fragments, each fragment of said set of consecutive fragments being offered in a plurality of quality levels corresponding to respective encoded data rates. The method comprises a session of transmitting one or more of requests for fragments and receiving via the network one or more replies to the requests containing fragments with target quality levels at said client. These fragments are displayed at said client. At a capture node requests and/or replies to the requests of the session are captured. The captured data is used to reconstruct at least part of the session as experienced (QoE) at the client.

14 Claims, 5 Drawing Sheets

(51) Int. Cl.
*H04N 21/2662* (2011.01)
*H04N 21/442* (2011.01)
*H04N 21/6373* (2011.01)
*H04N 21/2343* (2011.01)
*H04N 21/24* (2011.01)
*H04N 21/845* (2011.01)
*H04L 29/06* (2006.01)
*H04N 21/44* (2011.01)

(52) U.S. Cl.
CPC ... *H04N21/234327* (2013.01); *H04N 21/2402* (2013.01); *H04N 21/8456* (2013.01); *H04L 65/1069* (2013.01); *H04L 65/4084* (2013.01); *H04L 65/80* (2013.01); *H04N 21/44004* (2013.01)
USPC ........... 725/119; 725/118; 725/117; 725/116; 725/115; 725/114; 725/93; 725/91; 709/203; 709/217; 709/218; 709/219; 709/231

(56) References Cited

U.S. PATENT DOCUMENTS

| | | | | |
|---|---|---|---|---|
| 6,941,378 | B2* | 9/2005 | Apostolopoulos et al. ... | 709/231 |
| 7,818,355 | B2* | 10/2010 | Mills et al. .................... | 709/203 |
| 7,904,187 | B2* | 3/2011 | Hoffberg et al. ............... | 700/83 |
| 7,966,078 | B2* | 6/2011 | Hoffberg et al. ............... | 700/17 |
| 7,987,003 | B2* | 7/2011 | Hoffberg et al. ............... | 700/17 |
| 8,234,350 | B1* | 7/2012 | Gu et al. ........................ | 709/217 |
| 8,548,607 | B1* | 10/2013 | Belz et al. ...................... | 700/21 |
| 8,589,996 | B2* | 11/2013 | Ma et al. ........................ | 725/114 |
| 8,656,442 | B1* | 2/2014 | Clarke et al. ................... | 725/116 |
| 8,751,677 | B2* | 6/2014 | Li et al. .......................... | 709/231 |
| 8,793,749 | B2* | 7/2014 | Bennett .......................... | 725/93 |
| 2003/0233464 | A1* | 12/2003 | Walpole et al. ............... | 709/231 |
| 2004/0049576 | A1 | 3/2004 | Schweitzer et al. | |
| 2005/0243868 | A1* | 11/2005 | Tamai ........................... | 370/476 |
| 2006/0174276 | A1* | 8/2006 | Derrenberger et al. ......... | 725/46 |
| 2007/0162945 | A1* | 7/2007 | Mills ............................. | 725/119 |
| 2008/0091845 | A1* | 4/2008 | Mills et al. .................... | 709/246 |
| 2009/0025047 | A1* | 1/2009 | Choi et al. ..................... | 725/91 |
| 2009/0322784 | A1* | 12/2009 | Sartori .......................... | 345/619 |
| 2010/0121974 | A1 | 5/2010 | Einarsson et al. | |
| 2010/0263012 | A1* | 10/2010 | Huang et al. .................. | 725/116 |
| 2011/0060792 | A1* | 3/2011 | Ebersviller ................... | 709/203 |
| 2011/0087794 | A1* | 4/2011 | Li et al. .......................... | 709/231 |
| 2011/0093605 | A1 | 4/2011 | Choudhury et al. | |
| 2011/0113453 | A1* | 5/2011 | Ralston et al. .................. | 725/62 |

OTHER PUBLICATIONS

Written Opinion of the International Searching Authority of International Application No. PCT/EP2012/058361 dated Sep. 25, 2012, 4 pages.
European Search Report of European Application No. 11305593.3-1244 dated Jan. 23, 2012, 6 pages.

* cited by examiner

METHOD FOR STREAMING VIDEO CONTENT, NODE IN A NETWORK FOR MONITORING VIDEO CONTENT STREAMING

FIELD OF THE INVENTION

The present invention relates to the field of networked video streaming services, in particular video streaming services offered over the Hypertext Transfer Protocol (HTTP) such as HTTP adaptive streaming (HAS).

BACKGROUND

In one typical implementation, an Internet-based video streaming service is offered over the HTTP protocol. As the quality of service of the Internet as a transport network is substantially "best effort", protocols have been devised that take advantage to the maximal extent of the bandwidth available between a server and a client at any given time, by dynamically switching between different levels of video quality for the streamed content. HTTP adaptive streaming is an example.

Accordingly, at a time when the available bandwidth is high, for instance due to a decreased level of overall network traffic, it is advantageous to stream video encoded at a relatively high quality, representing graphics with a high data rate and/or resolution and/or a high frame rate. Similarly, at a time when the available bandwidth is low, for instance due to an increased level of overall network traffic, it is advantageous to stream video encoded at a relatively low data rate, representing graphics with a low resolution and/or a low frame rate.

HTTP Adaptive streaming (HAS) is an emerging technique for the delivery of video. It is supported by industry leaders such as Microsoft (Smooth-streaming) and Apple (Live-streaming). One of the advantages of HAS lies in the fact that the existing infrastructure for HTTP web-content (including HTTP servers and proxies, CDNs, . . . ) can be reused for video distribution.

Despite the growing popularity of HAS as a novel, improved video delivery solution, it is currently impossible for providers (content-provider, ISPs, CDN-provider) to track the delivered quality to the consumer.

SUMMARY OF THE INVENTION

According to an aspect of the present invention, there is provided a method for streaming video content from a server to a client over a channel via a network. The method includes the server offering said video content as a set of consecutive fragments, each fragment of said set of consecutive fragments being offered in a plurality of quality levels corresponding to respective encoded data rates. The client is able to receive and display the fragments, even if consecutive fragments have different quality levels. The fragments are requested and received as part of a session during the method. The session according to the method comprises transmitting one or more requests for fragments with target quality levels of said video content to be displayed at said client. The requests are sent over the network from said client to said server. Further the method comprises receiving over the network one or more replies to the requests at said client. The replies can contain the requested fragments with target quality levels. Further the one or more received fragments are displayed at said client. An embodiment of the method is HTTP-adaptive streaming.

According to an embodiment the method further comprises in the network capturing requests and/or replies to the requests of the session. The method further comprises reconstructing at least part of the session. This will allow obtaining parameters regarding the session as experienced at the client. The parameters relating to the reconstructed session can relate to quality of service, quality of experience. Reconstructing a session can relate to session variables/parameters only, not so much to the actual content.

Accordingly session parameters are reconstructed and can be used to improve services or monitor the results of a service.

In an embodiment of the present invention reconstructing at least part of the session as experienced at the client can comprise reconstructing selected fragment-qualities, buffer filling at the client, and user interactions (e.g. pause/resume, video cursor repositioning etc.). These parameters relate to the actual playing and displaying of the video during the session.

As an example reconstructing user interaction at the client is described. Even though requests sent by the client contain no indication for interaction by the user with the client, from the requests and the behavior of the client, it is possible to deduce and thereby reconstruct user interaction with the client, e.g. pausing. If after the possible pause-event, the client shows a request/reply pattern that is typical for a steady-state condition of the client where the client buffer is completely filled, it can be deduced that the user paused playback.

The features of the invention allow, once the reconstructed session is available, calculating the possible (HAS) artifacts from the reconstructed session. A list of artifacts includes picture freeze, quality decrease, quality variation and interactivity delay, explained in more detail below. These artifacts allow quantifying the user-experience. Any of these artifacts can be part of the reconstruction according to the invention.

The requests can be captured physically at the client or at the server or at any intermediate point between the client and the server.

In an embodiment, the method of the present invention further comprises measuring the available channel data rate at said client, and the target quality level is further selected as a function of the available channel data rate. In an embodiment the transfer time for transferring the fragment is taken into account. In an embodiment the buffer-filling is a parameter for selecting the target quality.

In an embodiment of the method of the present invention, the transmitting of the request comprises sending an HTTP request datagram. In a particular embodiment, the target quality level is indicated by at least one uniform resource identifier. In a particular embodiment, the target quality level is indicated by a parameter. In an embodiment the request is a HTTP-GET comprising at least a capture time and a fragment quality level.

In an embodiment reconstructing at least part of the session as experienced at the client comprises extrapolating at least one parameter of the reconstructed session. Although it is preferred that all requests and replies are captured as part of the method, caching, in particular local caching, can result in requests and replies not receiving the capturing point/node. The missing session information is reconstructed by making an interpolation between the latest received session information from before the interruption and after.

In an embodiment the method comprises transmitting over the network the reconstructed session. The reconstructed session can be provided to a provider (content-provider, ISP's, CDN-provider) to track the delivered quality to the consumer.

According to an aspect of the present invention, there is provided a node in a network for streaming video content as a set of consecutive fragments from a server to a client via the node in a session. The session will be displayed at the client.

The client will see the consecutive fragments. Each fragment of said set of consecutive fragments is being offered in a plurality of quality levels. A session can comprise consecutive fragments of different quality levels. During the session requests for fragments with target quality levels are sent from the client to the server and replies upon the requests containing one or more fragments with target quality level are sent to the client.

In an embodiment said node comprises at least a capturing device for capturing at least a part of said session and at least a reconstruction device for reconstructing part of said session as experienced (QoE) at the client. By capturing part of the session at a node details regarding the quality of the session are made available without adapting the player at the client. The insight of the invention is to use the captured session parts to reconstruct the session experience at the user. The raw requests and replies data are no indication for the quality of service/experience of the session at the client, nor for the experience at the client. Reconstruction however can be used to rebuild the session at the client using the session data captured at the node.

Timing of the requests/replies is taken into account as an additional variable on top of the content of the requests themselves.

In an embodiment of the present invention the reconstruction device is arranged to reconstruct user interactions at the client. By analyzing the requests and/or replies and the content, e.g. the requested quality level of the fragment, it is possible to deduct from the requested fragments the pausing of playout at the client.

In an embodiment the reconstruction device is arranged to reconstruct buffer filling and picture freezes at the client during the session. Buffer filling and picture freeze are important session qualities and session artifacts respectively. Reconstruction of the buffer filling is obtained by taking into account the content of the requests and replies and the timing of the requests and replies. Further client properties, such as player characteristics can be taken into account.

Other session qualities and artifacts can also be reconstructed.

The node can further comprise a transmitting device for transmitting the reconstructed session over the network. This allows making available the collected information.

According to yet another aspect a network for streaming video content as a set of consecutive fragments from a server in a session upon request from a client, wherein each fragment of said set of consecutive fragments is being offered in a plurality of quality levels corresponding to respective encoded data rates, over a channel. The network comprises a node according to any of the embodiment described herein.

"session as experienced by the client" comprises at least some quality of service parameters relating to the perception of the received session data.

"user interaction" is defined herein as any form of rendering of streamed video content other than normal-speed playback.

BRIEF DESCRIPTION OF THE FIGURES

Some embodiments of apparatus and/or methods in accordance with embodiments of the present invention are now described, by way of example only, and with reference to the accompanying drawings, in which.

DESCRIPTION OF EMBODIMENTS

In the following description, interaction between a client and a server is assumed, which client and server are defined in the usual way for hosts that participate in a network protocol with distinct roles.

The skilled person will appreciate that actions be ascribed to the "client" 200 may be carried out by any combination of hardware and/or software configured to interact with the server, and such actions may or may not be explicitly initiated by a human operator of the client equipment.

Likewise, actions ascribed to the "server" 270 may be carried out by any combination of hardware and/or software configured to interact with the server, and in particular by server equipment comprised in a content distribution network (CDN) 261 or storage area network (SAN) or an implementation of an HTTP proxy.

To allow dynamic switching between video encoding rates, video servers 270 generate separate video files (e.g., video clips or chunks encoded as files according to a file format such as MP4) for different time-fragments of the streamed contents, each of which is offered to the client in a variety of qualities, i.e. encoded at different data rates.

In an embodiment the client 200 assesses the available bandwidth of the downstream link from the server 270,261 to the client 200 from time to time or on a continuous basis, and requests 130 the appropriate version of the next required video fragment in accordance with that assessment. According to one scheme, the client requests 130 the version encoded at the highest data rate that is inferior to the presently measured downstream data rate. According to another scheme, the client takes into account statistical information about channel bandwidth fluctuations to determine the most appropriate encoding rate.

The different fragments to be selected by the client according to the above schemes may be addressed by means of dedicated Uniform Resource Identifiers (URIs). In this manner, the client simply has to select the appropriate URI for each new fragment. The available versions and their URIs are documented by the server along with associated metadata in a playlist or "manifest" file.

Combined with CDN caches 261, which provide caching and distribution of the chunks and thus offload the origin HTTP-server, adaptive streaming provides for a smooth video rendering experience in a scalable way, over best-effort internet.

One of the embodiments of the invention uses HTTP adaptive streaming (HAS). In HAS content is encoded in several bit rates and fragmented in pieces of typically a number of seconds. Information describing the different fragments involved in the playout and the available quality levels is contained in a so called manifest file. This manifest file is available at the HAS-server/proxy. Before the playout and download of fragments starts, the manifest file is retrieved by the client.

To avoid picture freezes, the client software will apply a playout buffer that can range from 7 seconds for (near)-live HAS streaming to more than 30 seconds for on-demand video delivery. Based on a number of criteria such as the actual buffer filling and the measured transfer-time of the requested fragments, the client software will decide the quality level of the next fragment that must be downloaded.

In the existing approach for QoE monitoring, a capture file or real-time captured information is used to detect generic network impairments (delay, loss, jitter, packet bursts Based on these observed impairments, a prediction is made about the visual artifacts that will be perceived by the user (picture blocks, freezes, out of sync, loss of detail . . . ). Depending on these artifacts, a quality-score can be defined for the entire session. Due to the video compression in the stream, this method turns out to be very complex and error prone as the impact of a packet loss is for example heavily depending on the frame-type (I/P/B), the amount of motion in the scene, the used motion-vectors in the compression.

It is an object of embodiments of the invention to simplify the prior art method.

The invention is at least partially based on the insight of using a capture file (or real-time capture) to reconstruct the entire (HAS) session, including selected fragment-qualities, buffer filling at the (HAS-)client, and user interactions (e.g. pause/resume, video cursor repositioning etc.).

The technique of (HAS-)session reconstruction offers a number of new possibilities. ISPs, CDN-providers and content-provider can have a clear and objective view on the quality of each (HAS) delivery. The early detection of faulty (HAS) deliveries can avoid customer churn. Aggregated HAS measurements will enable providers to monitor, benchmark and troubleshoot the HAS delivery capabilities of the network. In an advanced embodiment the method and node according to the invention can be used to substantially reduce the amount of picture freezes and interactivity delay for consumers, improving the average QoE experience.

In embodiments of the invention, the insights of the invention are combined with the known video streaming techniques.

Figure 1:
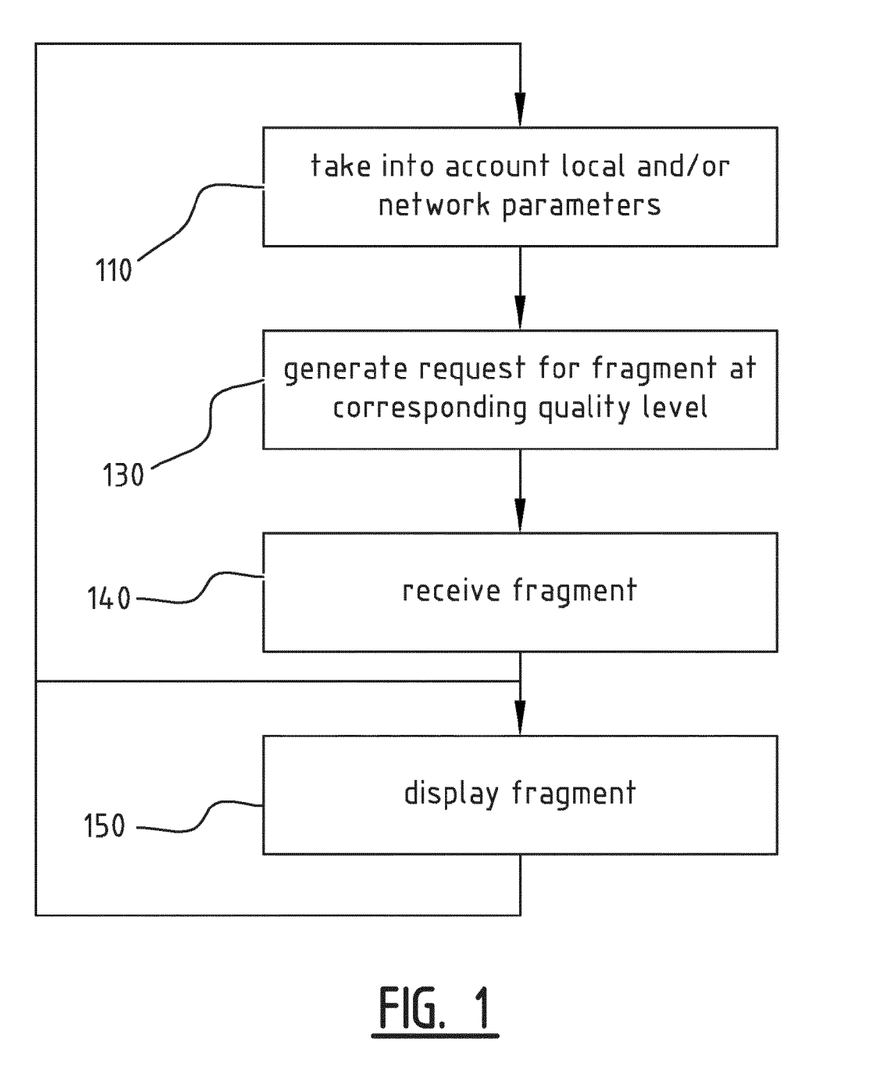
FIG. 1 presents a flow chart of an embodiment of the method of the present invention.

An embodiment of the method of the present invention will now be described in more detail with reference to FIG. 1. In step 110 some local and/or network parameters can be assessed, which may be performed on a continuous basis, or intermittently, for instance once before every request for a fragment. A network parameter can be the available bandwidth. A local parameter may be the buffer filling. Different parameters can be assessed in combination. Also the desired playback mode as indicated by the user can be taken into account.

The information from step 110 is combined in step 130, resulting in generating a request for a fragment with a quality level that corresponds with parameters taken into account in step 110.

As a result of the request, the appropriate fragment is received at step 140. The fragment is then displayed by the client at step 150. In streaming the requests to receive further fragments can be sent e.g. before displaying (received) earlier fragments.

Figure 2:
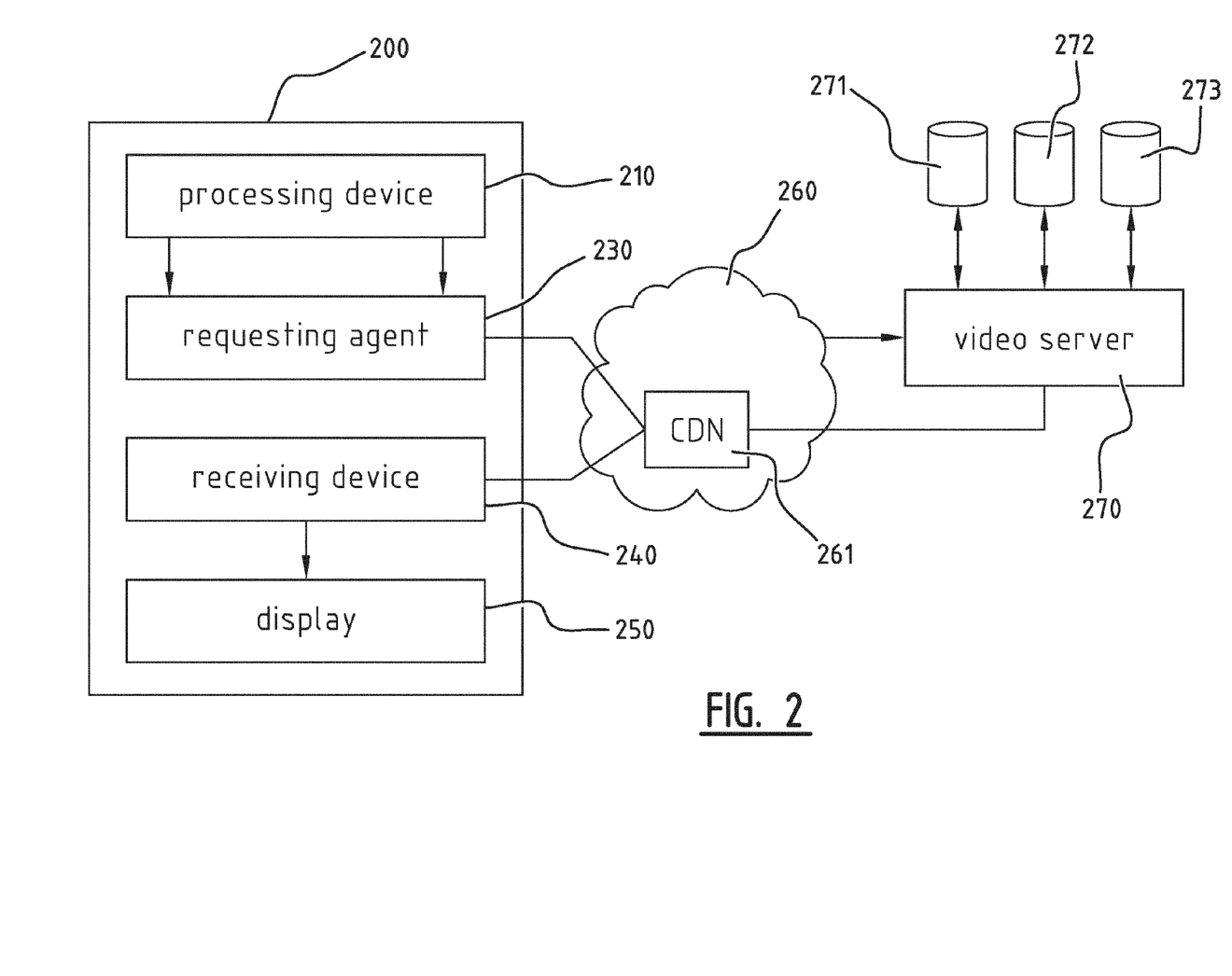
FIG. 2 presents a schematic diagram of network of the present invention.

An embodiment of the apparatus of the present invention will now be described in more detail with reference to FIG. 2. The apparatus is client device 200, such as a set-top box, a personal computer, a mobile telephone, or similar, connected to a video server 270 via a network 260 such as the Internet. Part of the network can be CND 261.

The access link connecting the client device 200 to the network 260 may for example be an xDSL line, a WiFi link, a 3G mobile link, a WiMAX link, or any other type of connection. The functions of the video server 270 may be fulfilled by one or more elements of a content distribution network (not shown) or a proxy element. Without loss of generality, the video server 270 is shown as having access to three versions 271, 272, 273 of a particular item of video content. Each version 271, 272, 273 comprises a set of fragments of certain duration.

Within the client device 200, a processing device 210 estimates the available parameters, such as the data rate on the downstream channel of the network 260, linking the video server 270 to the client device 200. This assessment may involve estimating the bandwidth. The assessment may additionally of alternatively involve measuring the actual amount of time required to download a known amount of data; in particular, the assessment of the data rate may involve timing the duration of the transmission of a or each incoming video fragment.

The client device 200 also comprises a user input means (not shown), which may be a remote control, a mouse, a keyboard, or a dedicated control panel, and the necessary drivers to interpret the signals provided by such devices. The user input means allows the user to select a desired playback mode, such as slow motion, full-speed playback, fast-forward, pause/resume, video-cursor-reposition, change viewpoint, etc. The desired playback mode can be assessed by the processing device 210.

On the basis of information obtained from the processing device 210, the requesting agent 230 selects a target quality level from among the quality levels 271, 272, 273 offered by the video server 270. Preferably, the target quality level is the highest sustainable quality level that may be downloaded without causing congestion on the downstream link and that can be consumed—by displaying the corresponding video content—at substantially the rate at which it is downloaded. This determination can be made according to the calculations described above. Once the target quality level is determined, a request is generated to obtain the next video fragment or fragments at the selected target quality level. The request is formatted according to the requirements of the protocol supported by the server 270. Preferably, the request is an HTPP "get" request, in which a URI is specified that corresponds to one or more particular quality levels. More preferably, the request further comprises parameter that corresponds to one particular quality level among those designated by the URI, notably the selected target quality level.

In response to the request, the video server 270 transmits the appropriate version of the requested video fragment to the client device 200 over the network 260. Using Scalable Video Coding or similar encoding techniques, a single fragment at a given quality level may be represented in multiple files, as part of the versions 271, 272, 273 of different quality levels. The skilled person will appreciate that different files pertaining to the same fragment, and files pertaining to different fragments of the same video stream, may be transmitted to the client device 200 over the network 260 from different sources, especially in network architectures that aim to optimize the usage of storage, such as content distribution networks 261. For the purpose of explaining the operation of the method of the present invention, this situation is no different than the situation with a single integrated video server 270.

A receiving device 240 of the client device 200 receives the video fragment, and conveys it to the display 250. The display 250 performs the usual decrypting and decoding steps, and adapts the frame rate and/or resolution of the video stream in such a way that the content is displayed according to the selected playback mode. The display 250 may further comprise an actual display built into the client device 200. Alternatively, the display means 250 may comprise an interface to connect to an external display.

As a result of the consecutive transmittal of requests, a set of consecutive fragments will be received at the client device 200.

Displaying the received fragments will result in a certain experience by the user dependent on e.g. the quality level of the fragments. A non limiting list of examples of artifacts that can be taken into account in assessing the quality of service at the client are:
- Picture freeze
- Low Quality
- Quality variation
- Interactivity delay Picture freezes can be the result of an underrun of the client buffer. This can happen when there is a (temporary) mismatch between the bandwidth estimation/perception of the client and the actual available bandwidth in the network. Picture freezes can be triggered by bandwidth fluctuations or by a mixture of cached and uncached fragments.

If the available bandwidth is low, the client will select a low(er) quality for its fragment downloads. In this way, the client will protect the viewer for picture freezes.

For many reasons (including competing HTTP adaptive streaming clients), the perceived bandwidth per client could fluctuate. Based on the perceived bandwidth, the client adjusts the selected quality. Each time the quality is adapted, the viewing experience of the user is potentially disturbed.

In many HAS clients, the user has the ability to reposition the video cursor or perform another type of user interaction. For most types of interaction (except pause/resume) the HAS client will have to invalidate its current fragment buffer and must fill this buffer again from scratch. Interactivity delay can be defined as the involved waiting time between the actual user-interaction and the display of the first picture of the new sequence.

Note that besides these four types of HAS artifacts other (potential) artifacts can be internally resolved by the HAS algorithms and underlying protocols (e.g. HAS for timing and synchronization, TCP for retransmission, . . . ).

Figure 3:
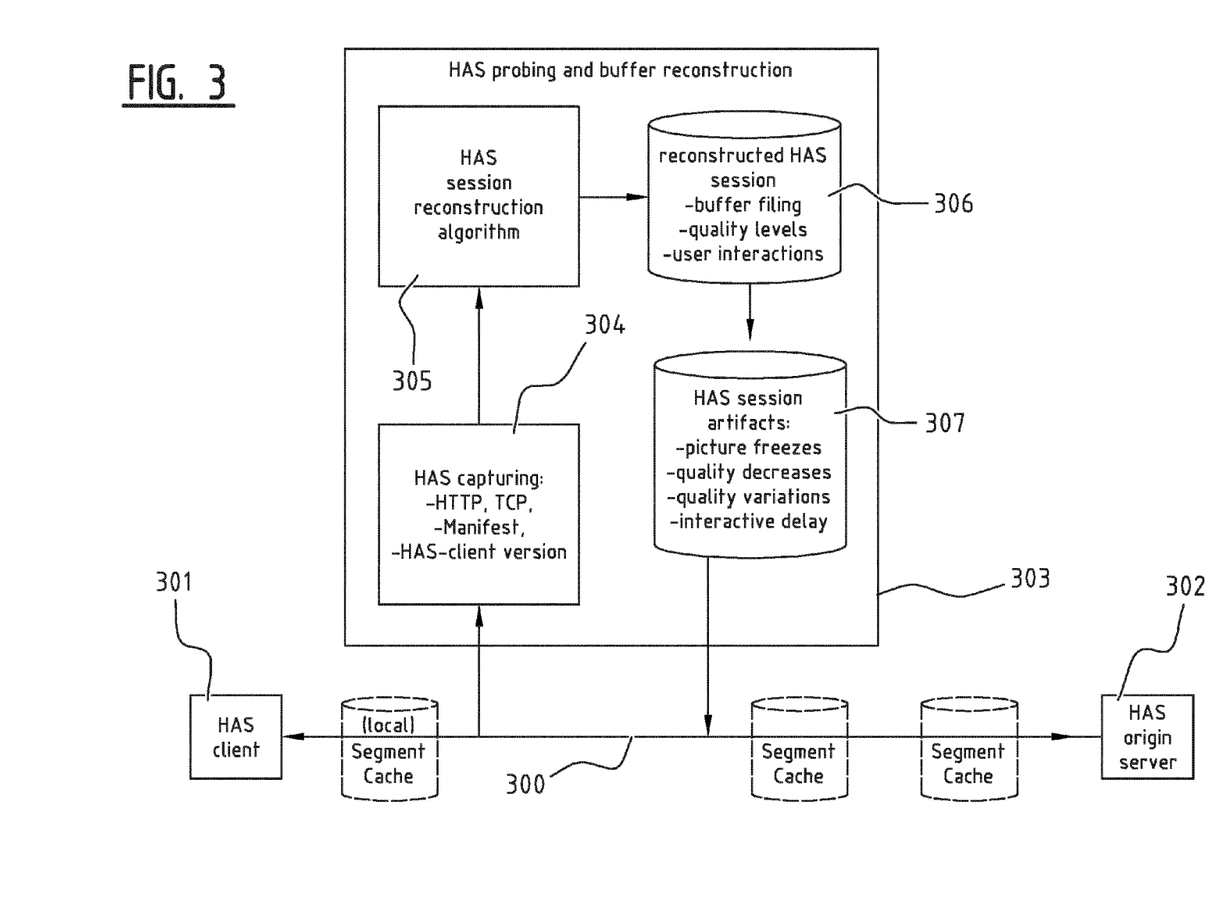
FIG. 3 is a schematic diagram of an embodiment of the present invention.

FIG. 3 is another representation of an embodiment of the present invention using a network 300. Network 300 is shown only schematically as a single connection between a client 301 and a server 302. The skilled man will understand that different and/or multiple connections are possible.

The network 300 allows the transmittal of requests for fragments of target quality level as well as the transmittal of replies to the requests containing the fragment of target quality level.

Node 303 is a node in the network and can be at any position within the connection between the server 303 and client 301. In embodiment node 303 is physically located on the client 301 or on the server 303. In an embodiment software installed on the client 301 forms the node 303.

The HAS stream over network 300 is captured at node 303. In this application capturing is to be understood as a step of duplicating at the node (parts of) the HAS stream. Capturing can comprise probing at a node, eavesdropping or intervention.

In an embodiment of the invention the captured data comprising at least some of requests and replies to the requests sent as part of the HAS session are used to reconstruct the quality of service (=experience) of the session at the client. Reconstructing the session at the client allows obtaining data regarding the quality of service and the experience of the user at the client regarding the HAS-session.

To perform a complete reconstruction of the session, the following information can be retrieved 304 from the captured HAS stream:

1) On the level of the HTTP messages
   a. Request time per fragment: capture time of the HTTP-GET
   b. Requested fragment quality: available as parameter in the requested URL of the HTTP-GET
   c. Playtime of the individual fragments: available in the requested URL or in the manifest file
   d. Fragment duration: fixed or available in the manifest file (Others)
   e. Arrival time of the first bytes of the fragment: capture time of the HTTP-OK header
   f. Caching indications: use of HTTP message 304 "Not Modified" if the client has performed a conditional GET and the data in the server was not modified meanwhile
2) On the level of the TCP messages
   a. Arrival of the last byte of the HAS fragment
3) On the level of the HAS-client 301
   a. From the captured data, it is also possible to detect the used client software.

When information regarding the used client software is available, this information can be used for example to find the maximum buffer filling used by this client (-version) or other important behavioral characteristics of this client. An example of a behavioral characteristic of the client software is e.g. the client jumping to the lowest quality level when the buffer filling drops under a certain panic-threshold.

In an embodiment the client-version (represented by a *.XAP file in case of Smooth Streaming) can be determined from a combination of the file-name, the file-size, and a hash of the file can be used.

As part of reconstruction of the session parameters at the client, client-characteristics can also be deduced for each detected client-version. Deduction of characteristics can be based on observed retrieval patterns. Further client characteristics can be the max buffer filling, the panic threshold level, etc.

In an embodiment different nodes 303 can work together and forward characteristic client information to a central server (not shown in FIG. 3) in the network from where the client-behavior information is validated, filtered and conclusions distributed again to the node 303.

The captured session data 304 is inputted into a reconstruction algorithm 305 that will be described in more hereunder.

The reconstruction will allow obtaining parameters 306 relevant to the experience of the user at the HAS-client. The reconstructed parameters can be used to reconstruct 307 session artifacts such as picture freezes, quality decreases, quality variations and interactivity delay. These values can be used as data representing the experience of the user using the client 301. The duplicated session information can be provided 308 over the network 300 to a more central point in the network such as a network analyzer entity, collecting information for involved parties such as content provider, network-provider or CDN provider.

Further embodiments of specific process steps for reconstruction of the session will now be described.

In case fragments are locally cached in the browser or in an HTTP-proxy that is located between the node 303 and the end-user 301, these fragment requests will be missing in the node 303. As a consequence, the used quality level of these cached fragments remains invisible for the node 303.

Reconstruction of the missing quality levels can be performed using simple extrapolation of the missing quality levels. If the last available quality level before missing fragment(s) was a level 1 quality and the next quality level (after the missing fragments) is also level 1, the missing level can be set at level 1.

In an embodiment the quality level is inferred using elements such as current buffer filling, characteristics of the client such as threshold levels to move the quality up or down, the maximum number of quality steps in up and down direction that can be taken in a certain amount of time, the buffer-filling level after the missing fragments, etc.

Figure 4:
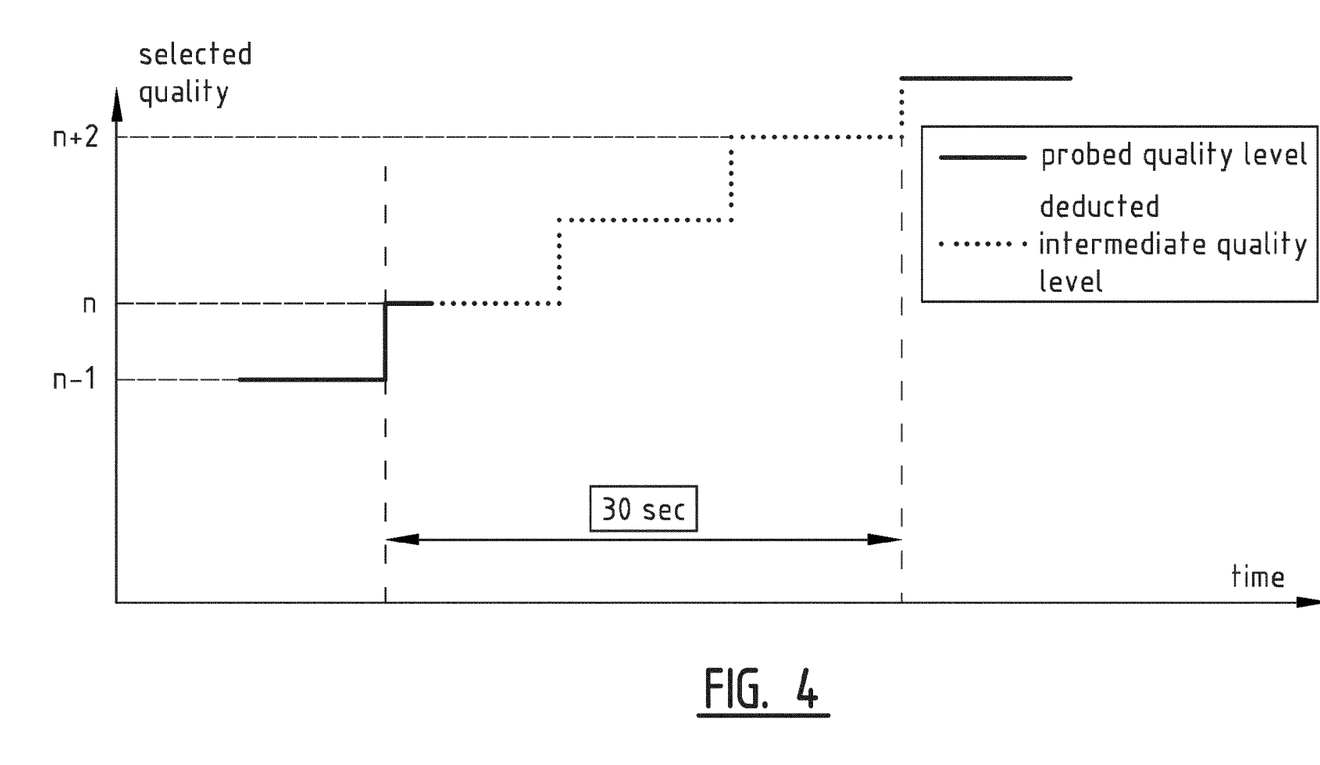
FIGS. 4-5 presents diagrams showing reconstructions of session parameters using the method according to the invention.

An exemplary embodiment is shown in FIG. 4. If a particular client restricted the quality-increase actions to e.g. a maximum of one quality level increase/decrease every 10 sec, and if a certain transition from level n to level n+3 took 30 seconds, the intermediate quality-levels can be calculated accurately based on this knowledge, without any knowledge of the received fragments during this 30 seconds.

In this example, during a period of about 30 seconds, the probe 303 did not receive any fragments/requests. When the probe receives a new fragment, the fragment is the $n+30^{th}$ fragment. The fragments that should have been requested by the client in order to continue the playout were not received by the probe. Reason for this could be that these segments (seg n+1 to seg n+29) were requested before (in a previous playout) and were served either 1) Served from the local cache of the web-browser
2) Served from the cache of an intermediate node between the client and the HAS probe.

Based on the duration per segment (e.g. 1 sec), the knowledge of the time when each segment must be played (seqnr) and the assumed progress of the playout (1 sec buffer every 1 sec), the HAS session reconstruction algorithm (HAS-SR) could extrapolate the missing segments in the session (e.g. equally spaced between the last received segment (n) and the next received segment (n+30) and based on this estimation calculate the possibility and the duration of a possible buffer-underrun.

As no information was captured regarding fragments n+1 and n+2, the probe 303 did not receive any indication of the requested video quality (VQ). Fragment n was requested with VQ1 and fragment n+30 was requested with VQ4. When the HAS-SR recognized the specific client/client-version and it is known that this client will only step-up the VQ after a timeframe of 10 seconds after the previous up-step, the HAS-SR algorithm deduces the quality-transitions as shown in this figure. In this way, the moment of the transition to VQ3 and later to VQ4 could be accurately estimated.

In an embodiment part of the reconstruction of the session at the client comprises tracking of the buffer-filling. Depending on the buffer filling, a fluctuation in available bandwidth can result in a picture-freeze or not. For this reason, the buffer-filling level (in seconds) at any point in the session is to be determined as part of the session reconstruction process.

In an embodiment several factors/events are taken into account while tracking the buffer-filling:
- arrival of video data: can be detected via the HTTP/TCP messages
- the regular playout of video data: is equal to the elapsed time
- the actual buffer filling: below zero, the playout will be suspended
- user interactivity, such as
  - repositioning of the video cursor: brings the buffer to zero until new data arrives
  - pause/resume actions: suspends the playout In an embodiment part of the reconstruction of the session at the client comprises taking into account the influence of user interactivity with the client 301. In case user interactivity is involved, the buffer-filling can not be predicted deterministically. The reason is that the HAS client 301 does not provide information towards the server 300 about ongoing user actions. These user-actions disturb the deterministic prediction of the buffer filling.

One example is the case where the viewer uses the pause-button while the client algorithm is fast-filling the buffer (e.g. during initial loading or after a user repositioning). The effect of this user action is not immediately visible in the GET pattern of the client since the client will use this pause to further fast-fill the buffer to a safe buffer-value. As a result, the pause potentially remains unnoticed by the HAS session-reconstruction, resulting in an underestimation of the buffer filling. The client heuristic gives the impression not to reach its full buffer capacity.

Figure 5:
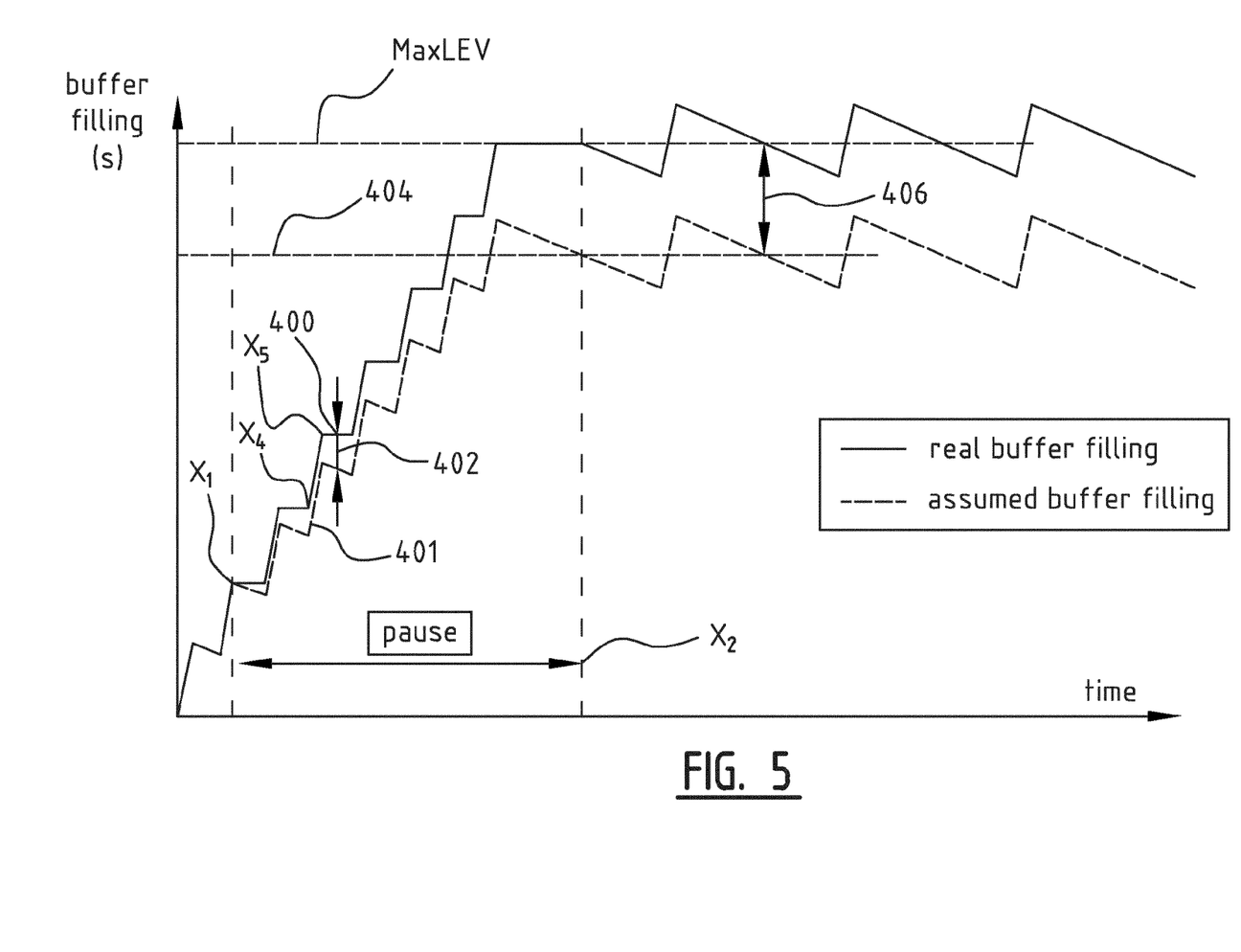

FIG. 5 shows an example. Generally during the initial loading, segments are loaded back to back to fill the client buffer. After this initial loading period, the client will switch to a steady-state behavior where additional waiting time between segments is inserted to avoid buffer overflow.

In this example, during the initial loading period at t=x1 the user pauses the player. During a pause the player will continue to request further fragments and receiving will continue. The actual buffer filling at the client is shown by graph 400. At x4 the buffer filling increases as a result of receiving a subsequent fragment. The increase ends at x5. The actual filling of the buffer remains at that level as no data is displayed from the local buffer as a result of the pause.

The actual buffer filling 400 increases in subsequent steps up to a maximum level indicated with a dotted lines. Typical maxlevels are between 20 seconds and 40 seconds for available players. Only at x2 will the buffer level decrease as a result of displaying fragments from the buffer. Thereafter further requests for fragments and receiving these requests/target fragments results in a buffer filling level at around the buffer max.

At the capture node the requests and replies are captured. In an embodiment the reconstruction method assumes continuous play. With time progression in reconstruction graph 401 is constructed. The 'height' difference between the two graphs 400,401 is exactly equal to the pause length at that time moment.

As a result of the pause, the probe underestimates the actual buffer filling.

In the reconstruction of the session is seems that the client's buffer has a maximum buffer level indicated by 404. If the maximum level for the buffer filling of the client's player is known in the probe, e.g. because of previous sessions handled by this probe or when the probe receives this information from a central collection and information point in the network, the reconstruction method can correct the underestimation. The time difference 406 can be estimated. Time difference 406 corresponds with the duration of the actual pause (between x1-x2). In the reconstruction method it is therefore possible to reconstruct a pause without actually receiving such information.

Another example is the case where the user is combining a pause with a reposition to a point that is further away in the playout. In this case, the session-reconstruction could reasonably assume that the missing GETs and OKs are caused by intermediate caching. Also in this case, the estimated buffer filling level could differ from the actual buffer filling level in the client.

In this case, information about the used client heuristic (e.g. max buffer filling applied by the client-(version)) will be used to correct the buffer filling. By detecting when the buffer is in steady-state, the buffer-filling can be adjusted accurately.

By monitoring a complete session reconstruction, it is possible, even without receiving in the node 303 input regarding certain user actions at the client 301.

In an embodiment based on the reconstruction of the HAS session in terms of requested fragment quality and actual buffer filling, it is possible to calculate the QoE parameters of the session, including but not limited to:

Picture freezes: number of picture freezes, total time of picture freezes, initial interactivity delay Playout quality: average playout quality, highest playout quality, lowest playout quality Quality variations: number of quality transitions (up/down), average number of steps in a quality transition Total interactivity delay, average interactivity delay per user action.

In addition, information could be provided on the average and highest buffer filling (as a measure for a smooth delivery of the video fragments) and on the observed behaviour of the user (number of pauses, total pause-time, user repositions, zapping and skipping, fragment popularity, . . . ).

Using these QoE parameters, it becomes now possible, for ISPs, content-providers and CDN providers, to permanently measure, monitor and track the global performance of the network when delivering HAS content. Further ISPs and CDN providers can perform HAS troubleshooting in the network. Reconstruction also allows content providers and CDN-providers to define measurable objectives for HAS deliveries that can be the basis of Service Level Agreements (SLAs). Further minimum values for the HAS service delivery quality can be defined.

As a result of the reconstruction of QoE at the client and providing the QoE data, caching issues relating to a HAS session can be optimized.

Fragments at the start of the content or at certain popular jump-points in the content are always requested with a very low buffer-filling (due to the initial loading or due to cursor repositioning by user). Based on the average buffer-filling when they are requested, the network might decide to store these fragments in caches that are located closer to the end-user. Another possibility is to take the average buffer filling per fragment into account in the cache-eviction strategy of the node. Fragments that are always requested with a low buffer filling could be kept longer in the cache. In both cases, the initial waiting time and the interactivity delay can be significantly reduced.

Note that reconstruction in a trusted network node can be considered safer compared to running a (modified) client that provides on a per request basis its actual buffer filling. Such a client could rather easily be manipulated or hacked to maliciously report very low buffer values to obtain an unfair amount of resources from the network.

The HAS-SR function could be running in the nodes involved in the delivery of the HAS flow could add a number of additional parameters (such as the current buffer filling, user-action such as pause/resume, etc.) to the original request to inform the intermediate nodes.

The functions of the various elements shown in the Figures, including any functional blocks labeled as "agents" or "processors", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the FIGS. are conceptual only. Their function may be carried out through the operation of program logic, through dedicated logic, through the interaction of program control and dedicated logic, or even manually, the particular technique being selectable by the implementer as more specifically understood from the context.

The invention claimed is:

1. A method for streaming video content from a server to a client over a channel via a network, said server offering said video content as a set of consecutive fragments, each fragment of said set of consecutive fragments being offered in a plurality of quality levels corresponding to respective encoded data rates, said method comprising a session of at least:

transmitting via the network from said client to said server one or more of requests for fragments with target quality levels of said video content to be displayed at said client; and receiving via the network one or more replies to the requests containing fragments with target quality levels at said client, wherein one or more fragments are displayed at said client, wherein the method further comprises in the network capturing requests and/or replies to the requests of the session and reconstructing at least part of the session as experienced at the client.

2. Method according to claim 1, wherein reconstructing at least part of the session as experienced at the client comprises reconstructing buffer filling and/or picture freezes at the client.

3. Method according to claim 1, wherein reconstructing at least part of the session as experienced at the client comprises reconstructing client-selected quality levels and quality variation.

4. Method according to claim 1, wherein reconstructing at least part of the session as experienced at the client comprises reconstructing user interaction at the client.

5. Method according to claim 1, wherein said transmitting of said requests comprises sending an HTTP request datagram.

6. Method according to claim 5, wherein said request is a HTTP-GET comprising at least a capture time and a fragment quality level.

7. Method according to claim 5, wherein said target quality level is indicated by at least one uniform resource identifier.

8. Method according to claim 1, wherein reconstructing at least part of the session as experienced at the client comprises extrapolating at least one parameter of the reconstructed session.

9. Method according to claim 1, further comprising transmitting over the network the reconstructed session.

10. A node in a network for streaming video content as a set of consecutive fragments from a server to a client via the node in a session, wherein each fragment of said set of consecutive fragments is being offered in a plurality of quality levels, the session comprising requests for fragments with target quality levels sent from the client to the server and replies upon the requests containing one or more fragments with target quality level, said node comprising at least a capturing device for capturing at least a part of said session;

at least a reconstruction device for reconstructing part of said session as experienced (QoE) at the client.

11. Node according to claim 10, wherein the reconstruction device is arranged to reconstruct user interactions at the client.

12. Node according to claim 10, wherein reconstruction device is arranged to reconstruct buffer filling and picture freezes at the client during the session.

13. Node according to claim 10, wherein the node further comprises a transmitting device for transmitting the reconstructed session over the network.

14. Network for streaming video content as a set of consecutive fragments from a server in a session upon request from a client, wherein each fragment of said set of consecutive fragments is being offered in a plurality of quality levels corresponding to respective encoded data rates, over a channel, comprising the node according to claim 10.

* * * * *